United States Patent [19]

Plochocka et al.

[11] Patent Number: 5,216,070
[45] Date of Patent: Jun. 1, 1993

[54] INVERSE EMULSION CROSSLINKED POLYACRYLIC ACID OF CONTROLLED PH

[75] Inventors: Krystyna Plochocka, Scotch Plains; Jui-Chang Chuang, Wayne, both of N.J.

[73] Assignee: ISP Investments Inc., Wilmington, Del.

[21] Appl. No.: 760,273

[22] Filed: Sep. 16, 1991

[51] Int. Cl.$^5$ .............................................. C08L 31/00
[52] U.S. Cl. .................................... 524/801; 524/265; 524/109; 524/111; 524/220; 524/221; 524/243; 524/320; 524/375; 524/377; 524/832
[58] Field of Search ............... 524/801, 265, 109, 111, 524/377, 832; 526/194

Primary Examiner—Joseph L. Schofer
Assistant Examiner—M. Nagumo
Attorney, Agent, or Firm—Jules E. Goldberg; Joshua J. Ward

[57] ABSTRACT

A method for forming a water-in-oil emulsion of a water-soluble polymer by emulsion polymerization of the corresponding monomer in the presence of an initiator and an emulsifier which is a polysiloxane polyalkylene polyether copolymer. The polymerization of acidic monomer can be carried out without complete neutralization of the monomer beforehand and without adverse effects on the emulsion stability. The water-in-oil product emulsion is easily inverted to a stable oil-in-water emulsion.

23 Claims, No Drawings

INVERSE EMULSION CROSSLINKED POLYACRYLIC ACID OF CONTROLLED PH

BACKGROUND OF THE INVENTION

I. Field of the Invention

This invention is related to novel inverse emulsion cross-linked polymer of controlled pH obtained from partly neutralized acrylic acid by use of siloxane-emulsifier system for water-in-oil emulsion polymerization. It further relates to a method for carrying out an inverse emulsion polymerization, and product obtained therefrom.

II. Description of the Prior Art

A variety of water-soluble polymers are produced by precipitation polymerization. Typical of such polymers are cross-linked polyacrylic acids, such as, the Carbopol® resins of B.F. Goodrich, which have been widely used as thickeners for aqueous systems. The unique thickening efficiency and rheological properties of these resins are attributed to the incorporation of an allyl cross-linker, such as, polyallyl sucrose or polyallyl pentaerythritol. With this technique, the polymer is usually produced in an organic solvent, e.g., benzene or ethyl acetate, from which it precipitates and is recovered in the form of a powder, which has to be filtered and dried. This presents a number of problems. For example, often residual organic solvent as well as unreacted monomer may be retained in the separated resin particles. For most end uses, these residual materials cannot be tolerated. In particular, these polymers are often used as thickeners in personal care products. The presence of such toxic solvents or monomers renders the polymer unusable for this purpose, unless it is first treated to remove the impurities. Such treatments not only increase processing time, but significantly increase the processing cost.

Additionally, because the polymeric product is obtained in particulate form, and since it is normally utilized because of its ability to swell in water, the particles must again be redispersed into the end use composition. Such mixing and redispersion generally require rather complex mixing equipment which often is not available at the site of end use.

Additionally, the polymer is obtained in acid form and must be neutralized before it can be used in a personal care product. The neutralization step is required to obtain the thickening properties of the polymer. This again requires another processing step, adding to the cost of the use of the product.

Another important process for making water-swellable cross-linked polymers on a production scale is inverse emulsion polymerization.

In a typical inverse emulsion polymerization, a water-in-oil monomer emulsion is produced by adding a water phase of an aqueous solution of monomers, to an oil phase consisting of mineral oil, aromatic or aliphatic hydrocarbons and the like. The oil phase usually contains an appropriate emulsifier. The monomer emulsion is then homogenized to obtain the proper particle size and then subjected to polymerization conditions to form a water-in-oil polymer emulsion, using a water-soluble or water-insoluble initiator. This inverse emulsion polymerization process has the advantages of producing polymers of a high molecular weight at a high polymerization rate compared to polymer from a typical solution or precipitation polymerization process of the same monomer. If a cross-linked polymer is to be obtained, a water-soluble cross-linking monomer is added to the system. Thereafter, a high HLB value surfactant is incorporated into the polymer emulsion and water is added to convert it into an oil-in-water system.

Although the inverse emulsion polymerization process has the above noted advantages, many problems, such as, poor emulsion stability, incomplete polymerization and difficulty in inverting into an oil-in-water system remain to be solved. One of the problems is obtaining a homogeneous, stable initial water-in-oil emulsion, containing monomer in water phase. This aim is usually achieved by using complex and expensive equipment, e.g., homogenizers, high shear mixers, and the like.

A variety of emulsifiers (surfactants or surface active agents) are used for the emulsification, sorbitan monooleate being one of the most popular and readily available. While these form stable emulsions, the water-in-oil polymer emulsion has typically a very high bulk viscosity and is difficult to be inverted into oil-in-water system.

United States patents relating to the foregoing include:

U.S. Pat. No. 3,826,771 discloses the use of sorbitan monooleate and sorbitan monostearate as the water-in-oil emulsifying agents.

U.S. Pat. No. 3,278,506 discloses the use of ethylene oxide condensates of fatty acid amides as the emulsifiers.

U.S. Pat. No. 4,024,097 discloses the use of surfactant systems consisting of an oil-soluble alkanolamide (e.g. Witcamide 511, Witco Chemical) and one or more co-emulsifiers of unesterified dialkanol fatty amide, salts of fatty tertiary amines, quaternized ammonium salts of fatty tertiary amines, alkali metal salts of fatty acids, and alkyl or alkyl aryl sulfates or sulfonates.

U.S. Pat. No. 4,672,090 and 4,772,659 both disclose a surfactant system for water-in-oil emulsions comprising an oil-soluble alkanolamide, a polyoxyethylene derivative of a sorbitan ester, and sorbitan monooleate.

One method for avoiding the above noted problems in inverse emulsion polymerization processes has been proposed utilizing an emulsifier which has an HLB value no greater than 7 and polymerizing a water-soluble monomer of a water-soluble polymer in a water phase present in a water-in-oil emulsion and in the presence of an emulsifier comprising a mixture of a nonionic oil soluble surfactant and a compound which may be a N-alkyl lactam or polymers of alkylated N-vinyl lactams. This emulsifier is disclosed in a copending application Ser. No. 07/760,272, filed Sep. 16, 1991, and entitled LACTAM-CONTAINING EMULSIFIER SYSTEMS FOR WATER-IN-OIL EMULSION POLYMERS naming Jui-Chang Chuang as the inventor, a co-inventor of the present invention.

The emulsifier and the process disclosed in this copending application are particularly useful for producing easily inverted oil-in-water emulsions of polymers which are suitable for use in the personal care area, for example, polyacrylates. However, certain problems arise in connection with this process and the product obtained therefrom specifically, when the monomer is acidic, the water-in-oil monomer emulsion is not stable.

The above problems are particularly difficult to solve in the case of the polymerization of an unsaturated carboxylic acid monomer e.g., acrylic acid. Unneutralized acrylic acid dissolves in both water and oil phases, and thus makes it impossible to carry the inverse emulsion polymerization. In contrast, acrylic acid salts such as, sodium, potassium or ammonium acrylates are soluble exclusively in the aqueous phase, which allows the inverse emulsion polymerization to be easily carried out. However, the polymerization of fully neutralized acrylic acid i.e., having a pH in the water phase of about 7, generates poly(sodium acrylate) which, in diluted water solution, has a pH of about 9. The same principle applies to lightly crosslinked poly(sodium acrylate). The high pH of polyacrylate polymers prepared from fully neutralized acrylic acid monomer limits their applications, particularly in the skin care area, which requires a pH in the range of about 6 to 7.5.

Although it is possible to adjust the pH of such crosslinked poly (sodium acrylate) solution with an acid, e.g., acetic or citric acid, such a pH adjustment produces a corresponding sodium salt, which, in turn, substantially reduces the thickening power of the polymer.

An attempt to polymerize partially neutralized acrylic acid monomer in an effort to produce a resulting polymer having the required pH of 6 to 7.5 in diluted aqueous solution by known methods was unsuccessful. This was due to the inadequate stability of water-in-oil monomer system containing the partially neutralized acrylic acid in the aqueous phase. We have found that none of the conventional surfactants used in an inverse emulsion polymerization according to prior art were sufficiently efficient to make polymerization of such a system possible.

SUMMARY OF THE INVENTION

We have discovered a method for carrying out an inverse emulsion polymerization process of a partly neutralized unsaturated carboxylic acid monomer, to produce a water-soluble polymer thereof of controlled pH, suitable for contact with the skin e.g., at a pH of about 6 to 7.5.

More particularly, we have discovered that a water-soluble unsaturated carboxylic acid monomer of a water-soluble polymer which has been from about 65 to 85 percent neutralized can be successfully emulsion polymerized in a water phase present in a water-in-oil emulsion by using an emulsifier containing an emulsion stabilizing effective amount of a polysiloxane polyalkylene polyether copolymer. In addition, we have discovered that, with the inventive process, a water-in-oil emulsion of the polymeric product is obtained which is at a pH acceptable for contact with the human body, i.e, about 6.0 to 7.5. With the inventive system and process, the emulsion remains stable during the course of the polymerization, even though the monomer was not fully neutralized. This water-in-oil emulsion of the product polymer can be easily diluted with an aqueous system to invert the emulsion to a neutral oil-in-water emulsion to which various active ingredients, e.g., skin care agents, hair care agents, and the like can be added. The diluted, i.e., inverted emulsion is immediately suitable for personal care product use because of its neutral pH.

DETAILED DESCRIPTION OF THE INVENTION

The process of the present invention comprises forming a polymerization mixture of an appropriate partially neutralized acidic monomer for a water-soluble polymer as a water-in-oil emulsion, the monomer being in the water phase. The polysiloxane polyalkylene polyether copolymer utilized as the emulsifier in the present invention is represented by the following formula (I):

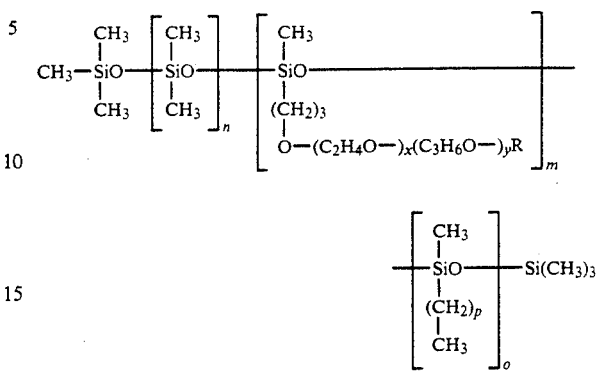

in which
R is an alkyl radical with 1 to 4 carbon atoms or hydrogen;
n = 10 to 200;
m = 1 to 25;
o = 1 to 100 with the proviso that o is not less than m, and 3 o is less than n in the average molecule;
p = 7 to 17; and
wherein the molecular weight of the $(C_2H_4O-)_x(C_3H_6O-)_yR$ radical is 250 to 2,000 with x and y being selected so that the weight ratio of oxyethylene to oxypropylene is 100:0 to 20:80.

Such compounds are disclosed in U.S. Pat. No. 4,698,178, incorporated herein by reference and are commercially available from Goldschmidt Chemical Corp. As disclosed in this patent, the compounds shown therein can be used as emulsifiers for the preparation of water-in-oil emulsions wherein the oily phase consists of or contains silicon oil. However, we have discovered that these compounds may be used as an emulsifier in a polymerization process wherein no silicon oil is present and wherein a monomer is converted to a polymer and wherein the product polymer is in the water phase of a water-in-oil emulsion. In addition, we have further discovered that these water-in-oil emulsions as produced from the polymerization process may easily be converted into an oil-in-water emulsion merely by dilution and mixing with water containing a high HLB surfactant.

The amount of the polysiloxane-polyalkylene-polyether copolymer emulsifier to be used in the method of the present invention is essentially the amount used for conventional emulsifiers in inverse polymerization processes of this type. Thus, there is no criticality as to the amount of emulsifier, so long as it is sufficient to maintain the stability of the water-in-oil emulsion of the monomer initially, the water-in-oil emulsion during the polymerization process, and the water-in-oil emulsion of the polymer product for the time period required for safe storage.

The polysiloxane polyalkylene polyether can be used alone. If desired, other surfactants may also be added to the polymerization mixture although they are not absolutely required. If used, such surfactants may be the conventional oil soluble non-ionic surfactants well known in the art. Preferred as non-ionic oil-soluble surfactants are those having a molecular weight of from about 300 to about 10,000, even more preferably from 400 to 8,000. The following nonionic oil-soluble surface active agents are illustrative of those which can be used: polyglyceryl monoalkyl esters, glycerine monoalkyl esters, sorbitan monoalkyl and polyalkyl esters, saccharose esters, and the like.

Particularly preferred are the sorbitan mono or polyalkyl esters and triglyceryl monoalkyl esters. Commercially oil-soluble nonionic surface active agents are Span ® 80 (sorbitan monooleate) or Span ® 85 (sorbitan trioleate) available from ICI Americas. Other preferred types of surfactants are triglyceryl monoleate or monostearate available from Stephan Company or from PPG/Mazer Chemicals. Emulsifier systems for the polymerization in water-in-oil inverse emulsions may also contain other components, e.g., polysiloxane compounds or fatty acid esters which are added in order to modify properties of the final polymeric product but do not affect the stability of the polymerization mixture or the inversion or pH properties of the final product. The emulsifier system according to the invention, has to have HLB value below about 6, preferably in the range from about 3 to 6 and most preferably, in the range of about 3 to 5.

It has been found that by using polysiloxane polyalkylene polyether emulsifier in accordance with the invention, special equipment e.g., high speed shear devices for homogenization of the initial water-in-oil emulsion of monomer is unnecessary, and that simple agitation is sufficient to prepare a stable reaction system.

By utilizing an emulsifier in accordance with the present invention and having the required HLB value, a water-in-oil polymerization product is obtained which is easily and readily converted into an oil-in-water product ready for use by simple mixing with water or an aqueous solution of an appropriate surfactant having an HLB value about or above 8, e.g., an ethoxylated nonylphenol surfactant. Preferred surfactants include polyoxyalkylene alkyl aryl ethers, and polyoxyalkylene sorbitan alkyl esters.

Polyoxyalkylene alkylaryl ethers are represented by the following formula (II)

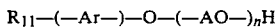

wherein $R_{11}$ is a branched or straight alkyl group containing 4 to 20 carbon atoms, e.g., butyl, t-butyl, octyl, γ-butyloctyl, and the like; Ar is a phenyl or naphthyl group; —(—AO—)— is an alkylene oxide group containing 2 or 3 carbon atoms, i.e., ethylene oxide or propylene oxide; and n is an integer of 5 to 100, preferably 15 to 50. Of those ethers represented by formula (II), a polyoxyethylene alkylphenyl ether is particularly preferred.

Polyoxyalkylene sorbitan alkyl ester is represented by the following formula (III):

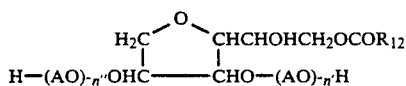

wherein —(AO—)— is the same as defined above;

$R_{12}$ is a branched or straight alkyl group, e.g., dodecyl, pentadecyl, heptadecyl, and the like; and n', and n" are each integers of 5 to 100.

Of those represented by formula (III), polyoxyethylene sorbitan alkyl ester is preferred to provide the inverted oil-in-water composition. Various active agents, e.g., hair care agents, skin care agents and the like may be admixed with the oil-in-water emulsion product to produce the final end use product.

The initiator systems which can be used in the present process include those which are conventional in the art. However, we have found that for products whose end use is in the personal care area, e.g., cosmetic, skin care, or hair care, and the like, a t-butyl hydroperoxide/ascorbic acid redox initiation system is preferred.

As the oil phase, various types of inert, water insoluble organic liquids, such as, aromatic or aliphatic hydrocarbons can be used. We have found that excellent products can be obtained by using mineral oils of the kind used in personal care products, e.g. Carnation ® light mineral oil (Witco Chemical) oil.

Numerous water soluble polymers may be prepared utilizing the inventive process. These include, for example, polymers and copolymers of acrylic acid, methacrylic acid, itaconic acid, maleic acid, fumaric acid and the like. Normally, aqueous solutions of the monomer from which these polymers are made are acidic and have a pH in the range from about 2 to 3. Preferred are the water-soluble salts of polyacrylic acid which are suitable for use in the personal care end use areas. With the present invention, the monomer is partially neutralized in the range from about 65% to 85%, preferably from about 65% to 75%, and most preferably about 70%. This can be accomplished by the addition of a conventional base which, of course, does not interfere with the polymerization, e.g., aqueous NaOH, KOH and the like.

In order to obtain lightly cross-linked polyacrylate a water soluble crosslinking comonomer is added. Although various conventional cross-linking monomers can be used, preferred is N,N-methylenebis-acrylamide. Other components, e.g., compounds chelating transition metal ions, e.g., ethylene-diamine tetracetic acid (EDTA), can be added to the reaction system.

The lightly crosslinked water-in-oil polymer emulsions of the invention exhibit high thickening efficiency in aqueous systems with the desired rheological properties. Instant thickening is easily achieved by inverting in the water system. The novel emulsifier system and redox initiator converts a water-in-oil partially neutralized monomer emulsion into a water-in-oil polymer emulsion. This water-in-oil polymer emulsion can be easily and effectively inverted into an oil-in-water emulsion by dilution with at least an equal amount of water on a volume basis. The pH of the thus obtained oil-in-water emulsion is in the range from about 6.0 to 7.5 and completely suitable for use in skin care products. The pH value of the inventive water-in-oil polymeric product when inverted and diluted to a 0.5 percent oil-in-water system is referred to herein as the inverted pH value. Preferably, the amount of water used is at least about 25 times the amount of the water-in-oil emulsion.

The residual monomer content in the water-in-oil polymer emulsion is extremely low, less than the 500 ppm limit detectable by HPLC or the 1000 ppm limit detectable by GC. Water-in-oil polyacrylate product emulsions according to the invention have a rather low viscosity, typically less than 10,000 cPs at 20 rpm and therefore, they are easy to handle. In contrast, water-in-oil polyacrylate product obtained according to the prior art have much higher viscosity, typically from 20,000 to 40,000 cPs at 20 rpm which makes their handling much more difficult.

The inventive water-in-oil polymer emulsions, are particularly useful as thickening agents in personal care products because of their pH range of 6.0 to 7.5 which is compatible with the skin and because of the substantial absence of unreacted monomers, which can be a health hazard. Additionally, the emulsion thickeners containing a polysiloxane based surfactant provide the desired smooth and soft, creamy feel which is beneficial for personal care products, such as, lotions, gels, and creams.

The following examples illustrate the invention (in the examples, all proportions are by parts by weight, unless otherwise designated):

EXAMPLE 1

A one liter resin kettle equipped with an anchor stirrer, nitrogen inlet, temperature probe, condenser and addition funnel, was charged with an oil phase consisting of 74.0 g of mineral oil (Carnation ®, Witco Chemical) and a surfactant composed of 12.0 g of cetyl-polyethoxylated-propoxylated-polysiloxane (ABIL ® B9806 - Goldschmidt Chemical Corporation). An aqueous phase consisting of the following listed components was added to the oil phase dropwise with stirring at 200 rpm:

320.0 g of a 37% solution of acrylic acid monomer neutralized with sodium hydroxide to about 70% to a pH of 4.8;

1.216 g of methylene-bis-acrylamide cross-linker (0.1% aqueous solution);

0.028 g of ethylene-diamine tetra-acetic acid trihydrate (Cheelox ® BF, GAF Chemicals Corporation).

A smooth, white, water-in-oil emulsion was formed with simple stirring, i.e., high shear homogenization was not required. The emulsion was purged with nitrogen gas. Thereafter, 0.4 g of a 10% aqueous solution of wt-butyl hydroperoxide was added and the reaction was started by the addition of 0.5 ml of a 0.5% aqueous solution of L-ascorbic acid. The ascorbic acid solution was added three more times in the same increments. An exothermic reaction proceeded and the temperature was maintained in the range from 20° to 35° C. by cooling with ice.

After five hours a smooth, creamy, easy to handle water-in-oil emulsion of cross-linked polyacrylic acid was obtained, with a Brookfield viscosity at 20 rpm of 10,000 cPs. A portion of the product emulsion was introduced into a 0 05% aqueous solution of Igepal ® CO-630 (ethoxylated nonyl phenol, GAF Chemical Corporation), the solids content being 0.5 weight percent based on the total weight of the mixture. The contents were mixed by shaking several times. This immediately produced a thick, slightly hazy gel having a viscosity at 20 rpm of 6080 cPs and a pH of 6.59.

EXAMPLE 2

A one liter resin kettle equipped with an anchor stirrer, nitrogen inlet, temperature probe, condenser and addition funnel, was charged with an oil phase consisting of 74.0 g of mineral oil (Carnation ®, Witco Chemical) and a surfactant blend composed of 6.0 g of cetyl-polyethoxylated-propoxylated-polysiloxane (ABIL ® B9806-Goldschmidt Chemical Corporation) and 6.0 g of Span 80 (ICI Americas). An aqueous phase consisting of the following listed components was added to the oil phase dropwise with stirring at 200 rpm:

320.0 g of a 37% solution of acrylic acid monomer, about 70% of which was neutralized with sodium hydroxide to a pH of 4.8;

1.216 g of methylene-bis-acrylamide crosslinker (0.1% aqueous solution);

0.028 g of ethylene-diamine tetra-acetic acid trihydrate (Cheelox BF, GAF Chemicals Corporation).

A smooth, white, water-in-oil emulsion was formed with simple stirring, i.e., high shear homogenization was not required. The emulsion was purged with nitrogen gas. Thereafter, 0.4 g of a 10% aqueous solution of t-butylhydroperoxide was added and the reaction was started by the addition of 0.5 ml of a 0.5% aqueous solution of L-ascorbic acid. The ascorbic acid solution was added three more times in the same increments. An exothermic reaction proceeded and the temperature was maintained in the range from 20° to 35° C. by cooling with ice.

After five hours, a smooth thick water-in-oil emulsion of cross-linked polysodium acrylate of Brookfield viscosity at 20 rpm of 9800 cPs was obtained. A portion of the product emulsion was introduced in a 0.05% aqueous solution of Igepal CO-630 (ethoxylated nonyl phenol), the amount of the solids content being 0.5 weight percent based on the total weight of the mixture. The contents were mixed by inverting several times. This immediately produced a thick, slightly hazy gel having a pH of 6.53 and Brookfield viscosity of 12,100 cPs (spindle No. 5 at 20 rpm).

As a comparison procedure, the same process was carried out without the presence of the polysiloxane polyalkylene copolymer, i.e., only 12.0 g of Span 80 was used. The emulsion in the reaction kettle was too unstable to carry out and complete the polymerization process.

EXAMPLE 3

A resin kettle equipped as in Example 1 was charged with an oil phase consisting of 74.0 g of mineral oil (Carnation ®, Witco Chem.), and 10.0 g of Abil ® WS 08 (Goldschmidt Chemicals) surfactant which was a mixture of cetyl poly(ethoxylated-propoxylated) polysiloxane; poly(ethoxylated-propoxylated) polysiloxane, hexyl laureate and polyglyceryl oleate. An aqueous phase of the following listed components was added dropwise to the oil phase with stirring at 200 rpm:

20.0 g of 37% aqueous solution of acrylic acid monomer about 70% of which was neutralized with sodium hydroxide to a pH of 4.8;

1.216 g of methylene-bis-acrylamide crosslinker; and 0.028 g of ethylenediamine tetra-acetic acid trihydrate (Cheelox BF, GAF Chem.)

A smooth, white, water-in-oil emulsion was formed by stirring only, without application of any additional homogenization. The emulsion was purged with nitrogen and 0.4 g of a 10% aqueous solution of t-butyl hydroperoxide was added. The reaction was started by adding 0.5 ml of a 0.5% aqueous solution of L-ascorbic acid. This increment of ascorbic acid was added three additional times during the reaction period. The reaction was exothermal and the temperature was maintained in the range of 20° to 35° C. by cooling with ice. After 5 hours, a smooth, thick water-in-oil emulsion of crosslinked polysodium acrylate was obtained having a Brookfield viscosity at 20 rpm of 9500 cPs. A small portion of this emulsion was diluted with 99.5% by weight of water containing 0.05% of Igepal C-630 in a Nessler tube. Several inversions of the tube provided an immediate stable, thick oil-in-water emulsion in the form of a slightly hazy gel having a pH of 6.57. The gel had a Brookfield viscosity of 17,200 cPs measured with a #5 spindle at 20 rpm.

EXAMPLE 4

A resin kettle as used in Example 1 was charged with 74 g of an oil phase consisting of mineral oil (Carnation ®, Witco Chemical) and a surfactant blend of 7.4 g of Abil B 9806 (Goldschmidt Chemicals) and 4.8 g of triglyceryl monooleate (Mazol PQ031 K from PPG/Mazer Chem.) To this mixture, which was stirred at 200 rpm, an aqueous phase was added dropwise which consisted of:

320 g of a 37% aqueous solution of acrylic acid monomer about 70% neutralized with sodium hydroxide to a pH of 4.8

1.216 g of a methylene-bis-acrylamide cross-linker (0.1% aqueous solution); and 0.028 g of an ethylene diamine tetra-acetic acid trihydrate (Cheelox BF - GAF Chemicals).

A smooth, white, water-in-oil emulsion was formed without any additional homogenization, i.e., high speed shearing was not required. The emulsion was purged with nitrogen and 0.4 g of a 10% aqueous solution of t-butylhydroperoxide was added. The reaction was started by adding 0.5 ml of a 0.5% aqueous solution of L-ascorbic acid and increments of this amount of ascorbic acid were added three additional times during the reaction. An exothermic reaction ensued and the temperature was maintained in the range of 20° to 35° C. by cooling with ice. After 5 hours, a smooth, thick, water-in-oil emulsion of cross-linked polysodium acrylate in the aqueous phase of Brookfield viscosity of 3500 cPs at 20 rpm was obtained. Upon addition of 0.5 weight percent of this emulsion to a Nessler tube containing water solution of 0.05% Igepal C-630 (99.5% by weight) and a several inversions, a thick, slightly hazy gel was immediately obtained. The gel was an oil-in-water emulsion having a pH of 6.55 and a Brookfield viscosity of 7200 cPs measured with a #5 spindle at 20 rpm.

EXAMPLE 5

The procedure and components of Example 1 were used, except that ethoxylated polysiloxane surfactant having a chemical structure similar to that used in Example 1 but not having a cetyl substituent (Silwet ® L-77, Union Carbide) was utilized. When this surfactant was used alone or in blends with other emulsifiers, e.g., Span 80 in 1:1, 3:1, 2:1, 1:2, 2:3, and 1:4 mixture, the emulsion system separated prior to the initiation of polymerization. Homogenization at high shear rates using a laboratory Wood-Gifford homogenizer did not improve the stability. Similar results were obtained using Span 85 (ICI Americas) in place of Span 80.

EXAMPLE 6

Three separate polymerizations were carried out using the procedures and reactants as in Example 2 with the exception that the aqueous solution of acrylic acid monomer differed in each run in the degree, i.e., percentage, of partial neutralization. Specifically 75%, 80%, and 90% neutralized solutions were used.

The 0.5% water-in-oil emulsions obtained were as follows:

| % Neutralization of Acrylic Acid | pH of 0.5% Water-in-oil Emulsion |
|---|---|
| 80 | 7.3 |
| 75 | 7.1 |
| 90 | 7.9 |

EXAMPLE 7—COMPARATIVE

A 1 liter beaker equipped with a laboratory size Wood-Gifford homogenizer was charged with an oil phase composed of 74 g of mineral oil (Carnation ®, Witco Chemicals) and a surfactant blend composed of 2.25 g of N-octylpyrrolidone (Surfadone LP 100 - GAF Chemicals Corporation) and 6.75 g of Span 80. This mixture was stirred at 200 rpm and an aqueous phase was added dropwise consisting of 320 g of 37% aqueous solution of acrylic acid monomer which had been neutralized to 100% with sodium hydroxide to a pH of 7.0;

1.216 g of a methylene-bis-acrylamide cross-linker (0.1 % aqueous solution); and 0.028 g of ethylenediamine tetra-acetic acid trihydrate (Cheelox BF, GAF Chemicals Corp.).

A smooth, white water-in-oil emulsion was formed using the Wood-Gifford homogenizer. The homogenized emulsion was charged to a 1 liter resin kettle and polymerization was carried out as in Example 1. A smooth, thick emulsion of a water-,in-oil cross-linked poly (sodium acrylate) was obtained having a viscosity of 33,100 cPs at 20 rpm.

A portion of this emulsion was added to 0.05% Igepal CO-630 in water in a Nessler tube to provide a 0.5% oil-in-water system. Upon several inversions, the system converted to a thick, slightly hazy gel having a pH of 9.20 and a Brookfield viscosity of 2500 cPs measured with a #5 spindle at 20 rpm.

When this same surfactant system and procedure were used for acrylic acid monomer which had been neutralized to a lesser degree with sodium hydroxide, for example, a neutralization degree of 80% (pH 5.3) or 70% (pH 4.8), the emulsion separated during polymerization and partly coagulated products were obtained.

What is claimed is:

1. In a method for the production of a water-soluble polymer wherein a water-in-oil emulsion of the corresponding monomer of the polymer is prepared using an emulsifier and subjected to polymerization in the presence of an initiator to produce the desired polymer in a water-in-oil emulsion, the improvement which comprises using as the emulsifier, an emulsifying effective amount of a polysiloxane polyalkylene polyether copolymer having the formula (I):

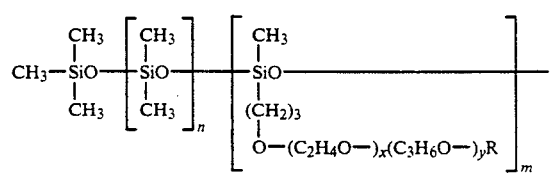

-continued

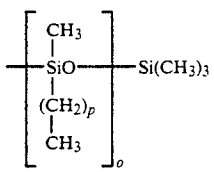

in which
R is an alkyl radical with 1 to 4 carbon atoms or hydrogen;
n = 10 to 200;
m = 1 to 25;
o = 1 to 100 with the proviso that o is not less than m, and 3 o is less than n in the average molecule;
p = 7 to 17; and
wherein the molecular weight of the $(C_2H_4O-)_x(C_3H_6O-)_yR$ radical is 250 to 2,000 with x and y being selected so that the weight ratio of oxyethylene to oxypropylene is 100:0 to 20:80.

2. The method of claim 1 wherein the HLB value of the emulsifier is not more than about 6.

3. The method of claim 1 wherein the HLB value of the emulsifier is not more than about 5.

4. The method of claim 1 wherein the monomer is an acidic monomer and is partially neutralized to a degree sufficient to produce a stable emulsion in the polymerization.

5. A water-in-oil emulsion of a polymer produced by the method of claim 4.

6. An oil-in-water emulsion of a water-soluble polymer obtained by diluting the water-in-oil emulsion of claim 5 with at least an equal volume of water.

7. The method of claim 4 wherein the monomer is neutralized to a degree from about 65% to 85%.

8. A water-in-oil emulsion of a polymer produced by the method of claim 7.

9. An oil-in-water emulsion of a water-soluble polymer obtained by diluting the water-in-oil emulsion of claim 8 with at least an equal volume of water.

10. The method of claim 4 wherein the monomer is from about 65% to 75% neutralized.

11. The method of claim 10 wherein the monomer is about 70% neutralized.

12. The method of claim 4 wherein the water-in-oil emulsion of the polymer as obtained has a pH in the range from about 6 to 7.5.

13. A water-in-oil emulsion of a polymer produced by the method of claim 12.

14. An oil-in-water emulsion of a water-soluble polymer obtained by diluting the water-in-oil emulsion of claim 13 with at least an equal volume of water.

15. The method of claim 1 wherein the emulsifier present in the polymerization consists of the polysiloxane polyalkylene polyether copolymer of formula (I).

16. The method of claim 1 wherein the emulsifier is a blend of the polysiloxane polyalkylene polyether of formula (I) and an organic oil soluble surfactant, the blend having an HLB value not greater than 6.

17. The method of claim 16 wherein the HLB value is from 3 to 5.

18. The oil-soluble surfactant of claim 16 selected from the group of sorbitan monooleate, sorbitan trioleate, triglyceryl monooleate and triglyceryl monostearate.

19. The method of claim 16 wherein the surfactant is sorbitan monooleate.

20. The method of claim 1 wherein the initiator is a combination of t-butyl hydroperoxide and ascorbic acid.

21. A water-in-oil emulsion of a polymer produced by the method of claim 1.

22. An oil-in-water emulsion of a water-soluble polymer obtained by diluting the water-in-oil emulsion of claim 21 with at least an equal volume of water.

23. The method of claim 1 wherein an organic oil-soluble surfactant is also present in the polymerization mixture and is selected from the group consisting of glycerine monoalkyl esters, sorbitan monoalkyl esters, sorbitan polyalkyl esters, saccharose esters; polyoxyalkylene alkyl ether, polyoxyalkylene alkyl aryl ether; polyoxyalkylene alkylamine; polyoxyalkylene alkylamide, aliphatic ethanolamide, methyloloamide; polyoxyalkylene sorbitan alkyl esters, and polyoxyalkylene glycol alkyl esters.

* * * * *